(12) United States Patent
Poulakis (10) Patent No.: US 9,506,672 B2
(45) Date of Patent: Nov. 29, 2016

(54) FASTENING SYSTEM, IN PARTICULAR FOR COMPONENTS OF PHOTOVOLTAIC SYSTEMS

(71) Applicant: Gottlieb Binder GmbH & Co. KG, Holzgerlingen (DE)

(72) Inventor: Konstantinos Poulakis, Hildrizhausen (DE)

(73) Assignee: GOTTLIEB BINDER GMBH & CO. KG, Holzerlingen (DE)

( * ) Notice: Subject to any disclaimer, the term of this patent is extended or adjusted under 35 U.S.C. 154(b) by 0 days.

(21) Appl. No.: 14/503,475

(22) Filed: Oct. 1, 2014

(65) Prior Publication Data

US 2015/0027070 A1 Jan. 29, 2015

Related U.S. Application Data

(62) Division of application No. 13/735,465, filed on Jan. 7, 2013, now Pat. No. 8,920,586.

(30) Foreign Application Priority Data

Jan. 9, 2012 (DE) .................. 10 2012 000 196

(51) Int. Cl.
*E04F 13/00* (2006.01)
*F24J 2/52* (2006.01)
(Continued)

(52) U.S. Cl.
CPC .............. *F24J 2/5245* (2013.01); *E04D 5/12* (2013.01); *E04D 7/00* (2013.01); *E04D 13/00* (2013.01); *F24J 2/5203* (2013.01); *F24J 2/5207* (2013.01); *F24J 2/5247* (2013.01); *H02S 20/00* (2013.01); *H02S 20/25* (2014.12); *F24J 2002/4659* (2013.01); *F24J 2002/4676* (2013.01); *F24J 2002/4692* (2013.01); *F24J 2002/5215* (2013.01); *F24J 2002/5218* (2013.01); *Y02B 10/12* (2013.01); *Y02B 10/20* (2013.01); *Y02E 10/47* (2013.01); *Y10T 29/49826* (2015.01)

(58) Field of Classification Search
CPC ...... H02S 20/00; F24J 2/5203; F24J 2/5207; F24J 2002/4692; F24J 2002/5215; F24J 2002/4659; F24J 2/5245
See application file for complete search history.

(56) References Cited

U.S. PATENT DOCUMENTS 8,316,593 B2 11/2012 Smith et al.
2010/0294340 A1* 11/2010 Cunningham ......... F24J 2/4614
136/251

(Continued)

FOREIGN PATENT DOCUMENTS

DE  693 14 301 T2  4/1998
DE  10 103 29 184 A1  1/2005

(Continued)

*Primary Examiner* — Brian Mattei
*Assistant Examiner* — Gisele Ford
(74) *Attorney, Agent, or Firm* — Wenderoth, Lind & Ponack, L.L.P.

(57) ABSTRACT

A fastening system, in particular for components of photovoltaic systems, preferably on roof surfaces of buildings, includes providing a support surface (1) and at least one fastening component (7, 19) of loops and/or other interlocking elements on the support surface. After applying the fastening component (7, 19) in the mounted state of the support surface (1), at least one other corresponding fastening component (7, 19) provided with other interlocking elements can be detachably connected to the fastening components (7, 19) on the support surface.

19 Claims, 7 Drawing Sheets

(51) Int. Cl.
*E04D 5/12* (2006.01)
*E04D 7/00* (2006.01)
*E04D 13/00* (2006.01)
*H01L 31/042* (2014.01)
*H02S 20/25* (2014.01)
*F24J 2/46* (2006.01)

(56) References Cited

U.S. PATENT DOCUMENTS

| | | | | |
|---|---|---|---|---|
| 2011/0041429 A1* | 2/2011 | Rummens | | F24J 2/4636 52/173.3 |
| 2011/0174353 A1* | 7/2011 | Urban | | F24J 2/5232 136/244 |
| 2011/0204195 A1* | 8/2011 | Stanley | | E04D 13/1407 248/224.8 |
| 2011/0260027 A1* | 10/2011 | Farnham, Jr. | | F24J 2/5207 248/309.1 |
| 2012/0137600 A1* | 6/2012 | Jenkins | | F24J 2/5245 52/173.3 |
| 2012/0304425 A1* | 12/2012 | Poulakis | | H02S 20/23 24/457 |
| 2013/0168340 A1* | 7/2013 | Urban | | F24J 2/5205 211/41.1 |

FOREIGN PATENT DOCUMENTS

| | | |
|---|---|---|
| DE | 10 2007 027609 A1 | 1/2009 |
| WO | WO 2011/076307 A1 | 6/2011 |

\* cited by examiner

FASTENING SYSTEM, IN PARTICULAR FOR COMPONENTS OF PHOTOVOLTAIC SYSTEMS

REFERENCE TO RELATED APPLICATION

This application is a divisional application of U.S. patent application Ser. No. 13/735,465 filed Jan. 7, 2013. The entire subject matter thereof is incorporated herein by reference.

FIELD OF INVENTION

The invention relates to a fastening system, in particular for components of photovoltaic systems, preferably on roof surfaces of buildings. Furthermore, the invention relates to a fastening system produced according to such a method, and to a support element and a support surface which are intended for use in such a fastening system.

BACKGROUND OF INVENTION

Fastening systems in which touch-and-close connections of complementary interlocking elements which can be engaged to one another are used in order to fasten components, such as solar power components, to support surfaces, especially roof surfaces, are prior art; compare, for example, DE 103 29 184 A1 or WO 2011/076307 A1. In the practical use of such systems, the attachment of the interlocking elements to an attachment surface of the supporting structure, that is to say, a building surface or roof surface, presents no problems only in those cases in which the surface composition of the attachment surface is suitable enough for producing the connection to the interlocking element. In roof surfaces, this is often not the case, for example, when there are concrete surfaces, or rough wood surfaces, or insulating layers. A reliable connection can be produced in such cases at best by using special touch-and-close fastener elements in which there are interlocking elements on a support which is compatible with the respective surface composition of the attachment surface. In ordinary touch-and-close fastener elements with fleece-like, nonwoven-like, or fabric-like backing, this is not the case. The necessity of special selection of the touch-and-close fastener elements to be used and the special measures which must be taken for a reliable attachment of the touch-and-close fastener elements to the attachment surface lead to complication and increased costs in the prior art.

SUMMARY OF THE INVENTION

With respect to these problems, the object of the invention is to devise a method for producing a fastening system which enables a simple, reliable, and economical fastening of the corresponding components.

This object is basically achieved according to the invention by a method where a support surface is be provided and at least one fastening component of loop and/or other interlocking elements is applied on the support surface after fastening the respective fastening component in the mounted state of the support surface, at least one other corresponding fastening component provided with other interlocking elements is detachably connected to the assignable fastening components. Regardless of the respective type of the attachment surface or roof surface, on the top of the support surface for attaching the fastening component a suitable joining surface is thus available so that touch-and-close fastener elements of any desired structure can be easily and reliably attached as fastening components.

Especially advantageously, the support surface can be produced from a bitumen mass or from plastic, on at least one surface region of the support surface at least one fastening component being attached, preferably by coating or laminating it on.

When using a plastic support surface, it is preferable to proceed such that the support surface is provided in the form of a thin plastic sheet, preferably of an elastomer material, for example, from a synthetic rubber material or a thermoplastic olefin.

In especially advantageous exemplary embodiments, it is possible to proceed such that to form the support surface, a backing web is provided, for example, in the form of a thin tape of a plastic, such as PET or the like, with the backing web being applied in one transport direction at an application station on which a bitumen mass is applied, preferably by doctoring, and being moved past a following attachment station at which the assigned fastening component is attached in the chosen surface area.

Bitumen layers as are installed as insulating layers on building surfaces or roof surfaces are often provided with an intercalated or attached granulate. When using a bitumen layer to form the support surface according to the method according to the invention, it is possible to proceed in this respect such that the backing web provided with the bitumen mass and with the fastening component is moved past a sprinkling station on which a granulate is applied on the surface regions which are free of the fastening component.

The subject matter of the invention is also a fastening system produced using the method according to the invention and characterized in that the respective fastening component can be joined to the support surface and is located on a support element designed as a holder for structural elements, especially components of photovoltaic systems.

Especially advantageously, the respective support element can be made in the form of a mounting rail which on the side facing the support surface is provided with the pertinent fastening component in the form of a touch-and-close fastener element. In this connection, the touch-and-close fastener element which is located on the support surface can be provided in the form of at least one tape which extends on the area of the support surface and along the respectively assigned mounting rail.

Especially advantageously, the respective mounting rail can be made in the form of a profile of plastic, for example, an acrylic-nitrile-styrene-acrylate. This type of profile can be extruded in an extrusion process and can be subdivided into longitudinal sections intended for the respective application.

Preferably, the respective profile is made as a hollow profile which has receiving spaces for holding lines or other components of photovoltaic systems which are inserted into them.

Especially advantageously, the respective hollow profile can have wall parts for forming support and/or fastening regions for solar panels.

The mounting rail, especially for the attachment of flexible solar panels, can be made in the form of a profile strip which has at least one longitudinal slot for accommodating the fastening edge of a pertinent solar panel, which edge is inserted into it.

The subject matter of the invention is also a support element for use in a fastening system according to the invention, with the support element being characterized in that it is made in the form of a mounting rail which has been extruded from a plastic material.

The subject matter of the invention is furthermore a support surface designed for use in the fastening system according to the invention and characterized in that it is formed from a bitumen mass or in the form of a thin plastic sheet, preferably of an elastomer material. On the top of the support surface there is at least one touch-and-close fastener element in a location which is in a positional relationship to an assigned support element which is to be fastened.

Other objects, advantages and salient features of the present invention will become apparent from the following detailed description, which, taken in conjunction with the annexed drawings, discloses preferred embodiments of the present invention.

DETAILED DESCRIPTION OF THE INVENTION

Figure 1:
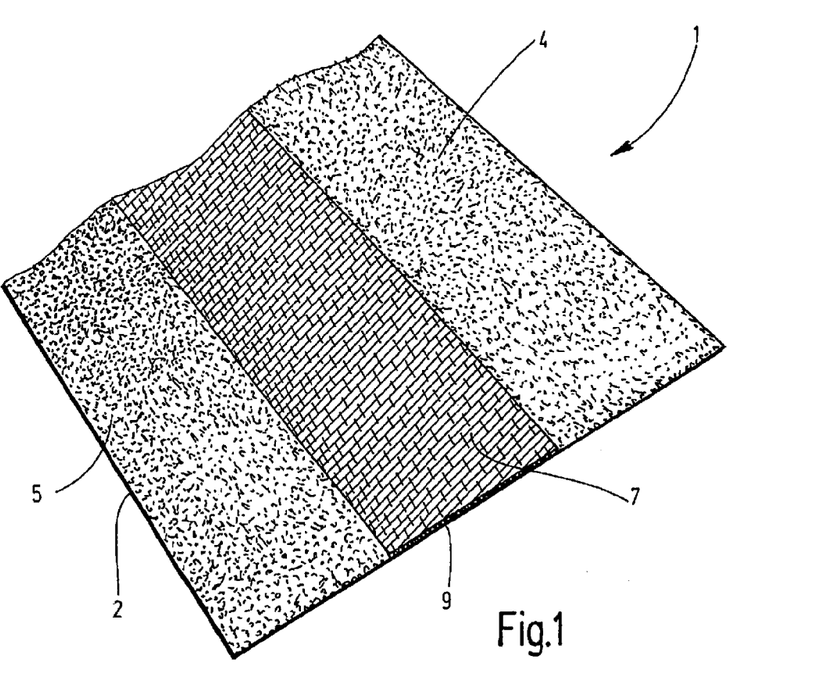
FIG. 1 is a partial detached perspective oblique view of one support surface in the form of a bitumen mass with a touch-and-close fastener element located on it as a component of one exemplary embodiment of the fastening system according to the invention.
Figure 2:
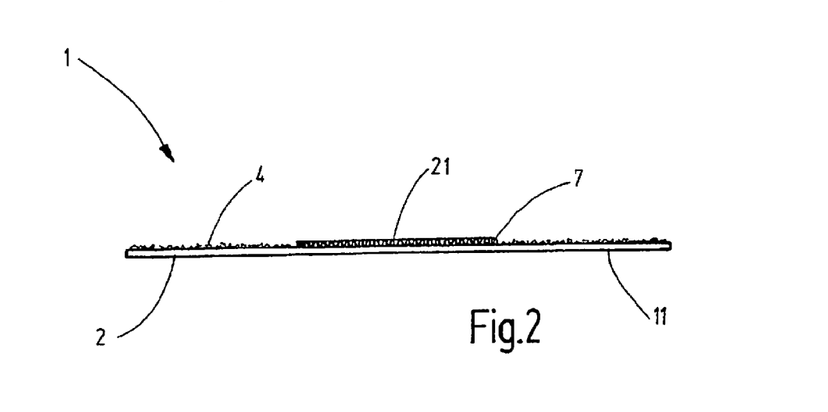
FIG. 2 is shows a side view of in the support surface of FIG. 1.

The exemplary embodiment of a support surface 1 shown in FIGS. 1 and 2 is formed by a bitumen web 2 on whose surface 5 a touch-and-close fastener element 7 is fastened. The latter extends in the form of a strip or tape 9 over the top 5 of the web 2 of bitumen mass, with the surface region of the bitumen web 2, which is free of the touch-and-close fastener element 7, being provided with attached granulate 4. The bitumen web 2, which is made to have a much larger area than the touch-and-close fastener element 7, with its underside 11 makes available a correspondingly large-area connecting region for the connection to a corresponding support surface (which is not shown), for example, a roof surface or components thereof.

The tape 9 of the touch-and-close fastener element 7 extends in a positional orientation which is aligned to an assigned support element which is to be anchored on the support surface 1. The respective support element 13 is a mounting rail shown in FIGS. 5 to 10 as exemplary embodiments, or is a respective profile strip 16 as is shown in FIGS. 11 and 12. In FIG. 1, on the support surface 1, there is only one tape 9 of the touch-and-close fastener element 7 for a single support element on the bitumen web 2. In systems with several support elements on a common support surface 1, there can be several tapes 9 with touch-and-close fastener elements 7, or there can be several support surfaces 1 with one tape 9 each, as is shown in FIG. 1.

Figure 3:
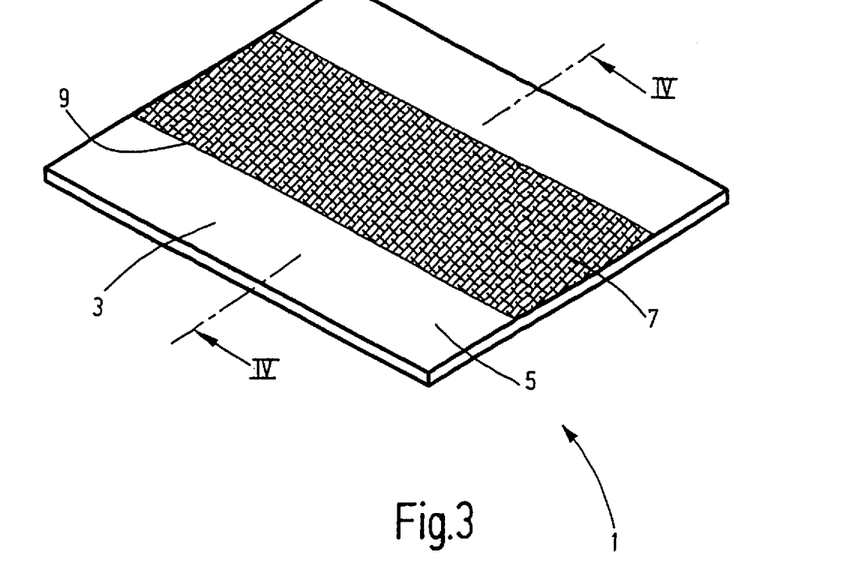
FIG. 3 is a perspective view of one support surface in the form of an elastomer plastic sheet with a touch-and-close fastener element located on it as a component of another exemplary embodiment of the fastening system according to the invention.
Figure 4:
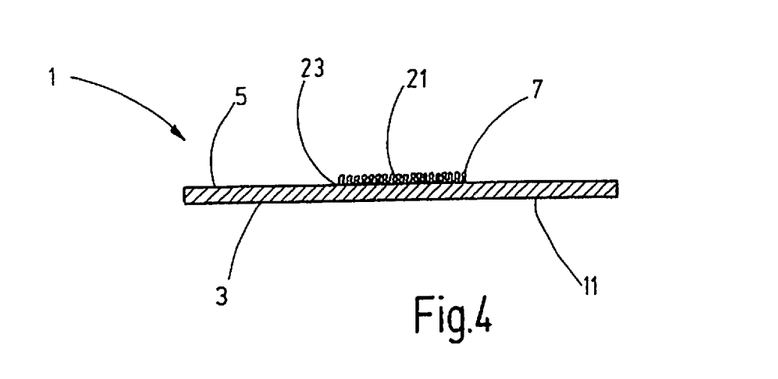
FIG. 4 shows a section according to section line IV-IV from FIG. 3.

FIGS. 3 and 4 show a second exemplary embodiment of the support surface 1 in the form of a sheet 3 of an elastomer plastic material, for example, a synthetic rubber or a thermoplastic olefin. As in the exemplary embodiment from FIGS. 1 and 2, a touch-and-close fastener element 7 in the form of a tape 9 on the top 5 of the support surface 1 is attached by coating or laminating it on. In the example of FIGS. 1 and 2, touch-and-close fastener elements which in the known construction can have interlocking elements 21 in the form of mushrooms, loops, or hooks. In the exemplary embodiments provided here, there are interlocking elements 21 in the form of loops in the touch-and-close fastener elements 7 provided on the support surface 1. These touch-and-close fastener elements 7 form a kind of fleece with a base formed by a fabric. With respect to the permeability of the base, in lamination or cementing onto the top 5 of the support surface, for example, of the bitumen web 2, the procedure is such that there is no material passage through the base, for example, by plasticized bitumen, to the region of the interlocking elements 21 in the form of loops.

Figure 5:
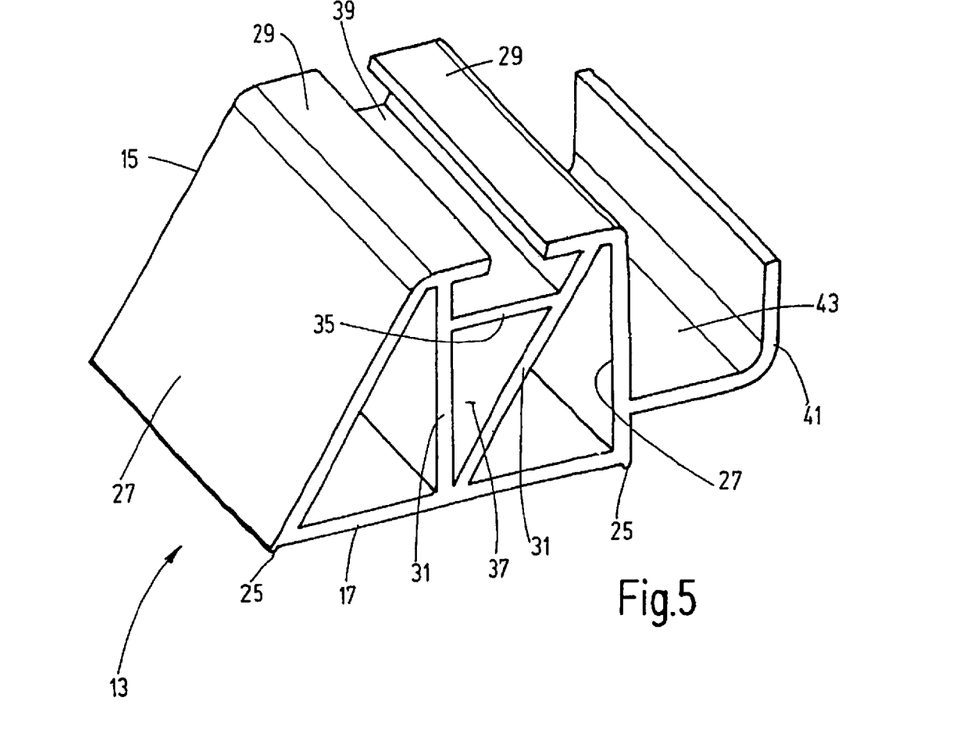
FIG. 5 is a perspective view of a longitudinal section of one exemplary embodiment of a support element as a component of one exemplary embodiment of the fastening system according to the invention.
Figure 6:
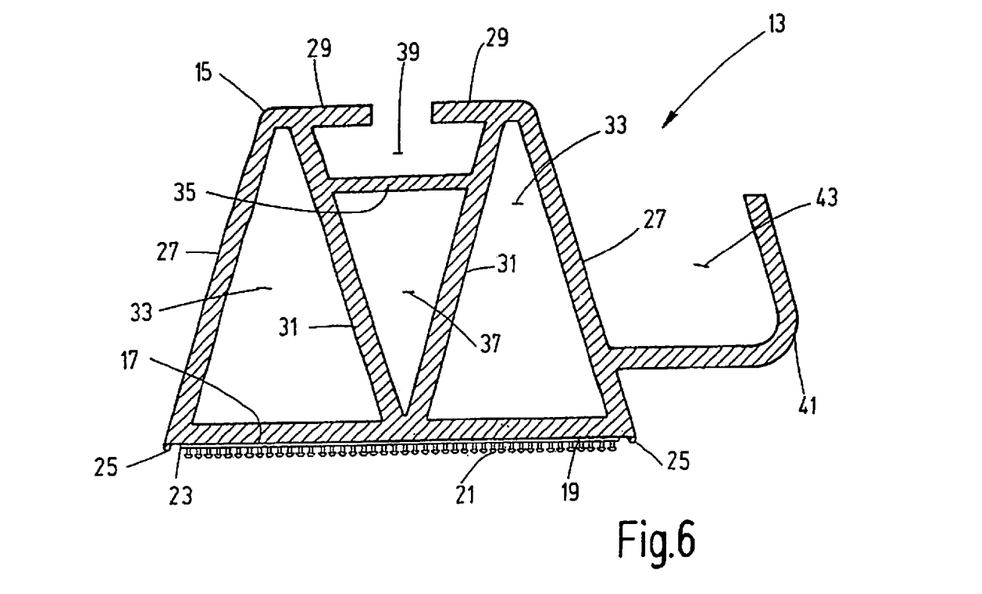
FIG. 6 is a side elevational view in a cross section of the support element of FIG. 5 with the assigned touch-and-close fastener element located on it.

FIGS. 5 and 6 show a first exemplary embodiment of a mounting rail 13 in the form of a hollow profile 15, which is extruded from a plastic material in an extrusion process. It can be a thermoplastic polymer, for example, acrylic-nitrile-butadiene-styrene (ABS) or preferably an acrylic-nitrile-styrene acrylate. In order to protect parts of the hollow profile 15 which are exposed during use, there can be a sunproof and/or weather-resistant coating at least on outside surfaces of the hollow profile 15. For example, materials such as polymethylmethacrylate (PMMA) or polytetrafluorethylene (PTFE) are suitable for this coating. This coating can be efficiently formed by a coextrusion method in the production of the hollow profile 15.

The hollow profiles 15 on the underside have a flat fastening surface 17 for attaching a touch-and-close fastener element 19 which corresponds to the touch-and-close fastener element 7 of the support surface 1. Like this touch-and-close fastener element 7, the touch-and-close fastener element 19 also has interlocking elements 21 on a backing 23 which on the side of the support surface 1 cements or bonds to the top 5 of the support surface 1 or is laminated onto it and on the side of the hollow profile 15 is cemented or bonded to the fastening surface 17. The touch-and-close fastener elements 7 and 19 can be made in a conventional manner, i.e., they can have conventional interlocking elements 21 in the form of mushrooms, loops, or hooks. In the present exemplary embodiment, the interlocking elements 21 are made on the hollow profile 15 in the form of mushrooms.

Instead of the example which is shown in FIG. 6 and in which the touch-and-close fastener element 19 with its backing 23 is fastened on the fastening surface 17, alternatively, the interlocking elements 21, especially in a version as mushrooms, can also be formed on the fastening surface 17 of the material of the hollow profile 15 itself. On the two end edges of the fastening surface 17 as an edge enclosure, a slightly projecting edge rib 25 is formed as a lateral guide for the respective tape of the touch-and-close fastener element 19 which is located on the fastening surface 17. The hollow profile 15 has, proceeding from the lower fastening surface 17, flat side walls 27 which run slightly converging upward and on the upper end undergo transition into profile webs 29 which extend opposite one another in the plane parallel to the fastening surface 17, but end at a distance from one another. Within the profile shape, inner walls 31 are formed which extend proceeding from the central region of the fastening surface 17 diverging to one another upward toward the profile webs 29 and with the side walls 27 border one receiving space 33 at a time. An intermediate wall 35 which runs in a parallel plane underneath the profile webs 29 between the inside walls 31 borders another triangular space 37 and an overlying space 39 which is open between the profile legs. The flat outside surfaces of the profile legs 29 and the space 39 which forms a type of dovetail guide form a support and attachment region for a pertinent component which is to be fastened (which is not shown), and it can be, for example, a component of a solar power system, for example, a solar panel.

Figure 9:
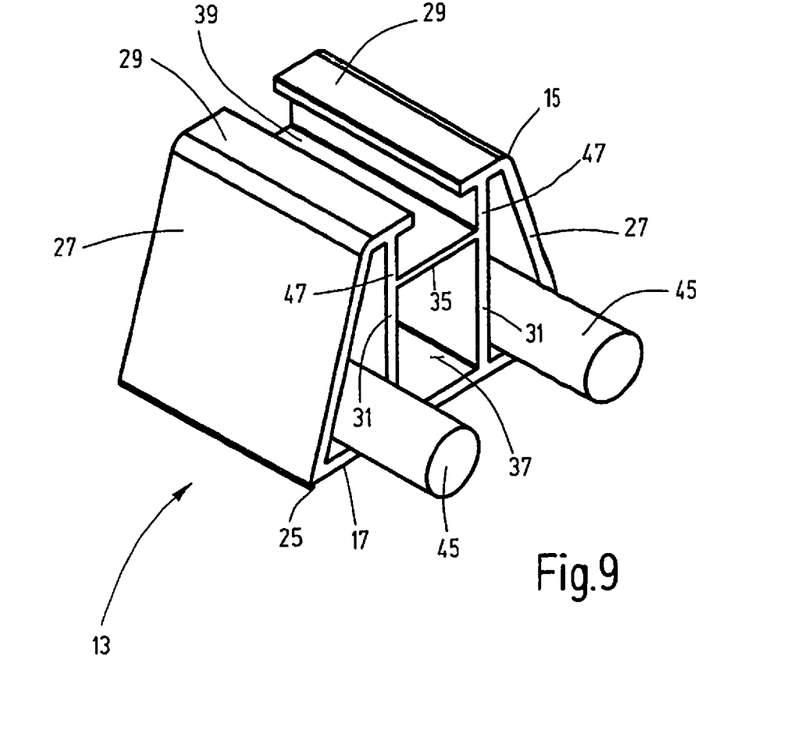
FIG. 9 is a perspective view of a support element similar to FIG. 7 with lines inserted into it according to an exemplary embodiment of the invention.
Figure 10:
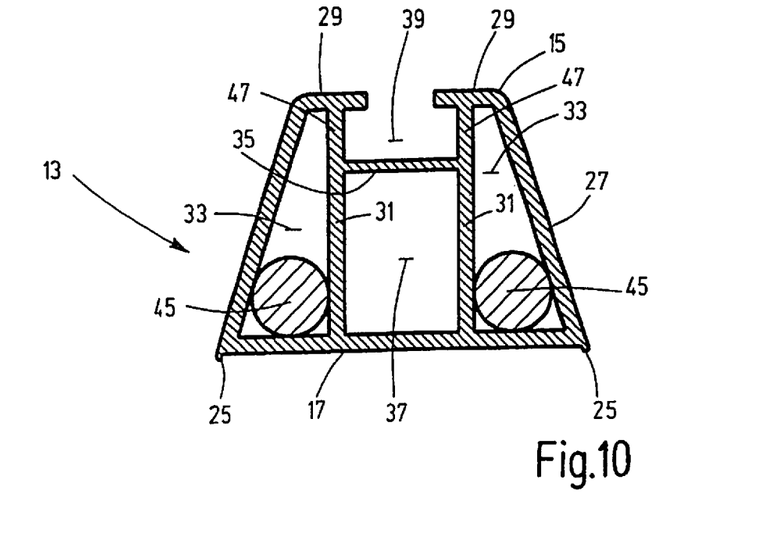
FIG. 10 is a side elevational view in cross section of in the support element FIG. 9.
Figures 11, 12:
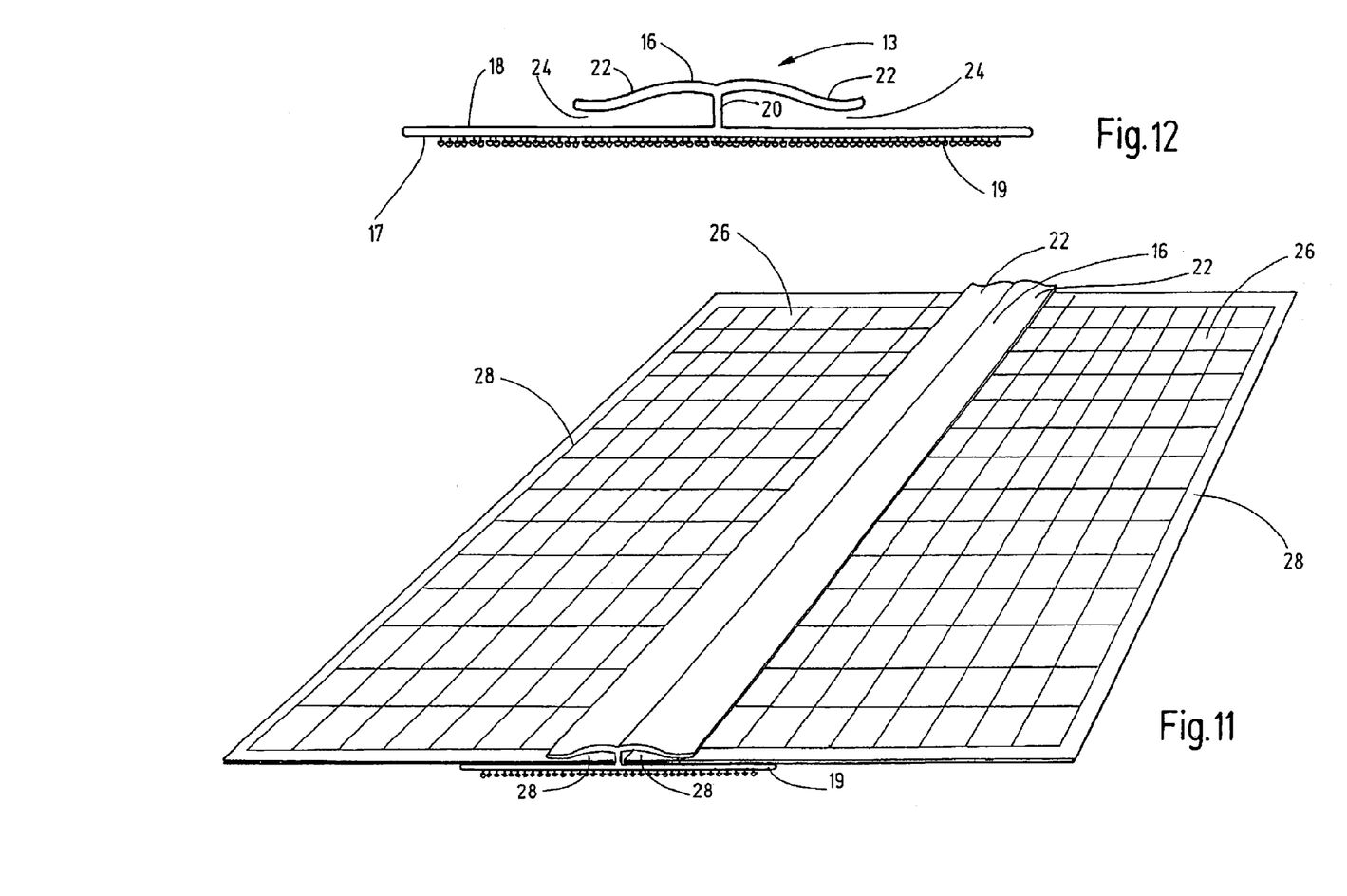
FIG. 11 is a perspective view of one modified exemplary embodiment of the support element in the form of a profile strip with solar panels fastened on it according to the invention.
FIG. 12 is an enlarged side elevational view of the profile strip of FIG. 11.

FIGS. 5 and 6 show one exemplary embodiment of the hollow profile in which an overhanging rail 41 is molded on one side wall 27 and forms an open receiving space 43 which can be used, for example, as a cable duct for lines 45 (FIGS. 9 and 10).

Figure 7:
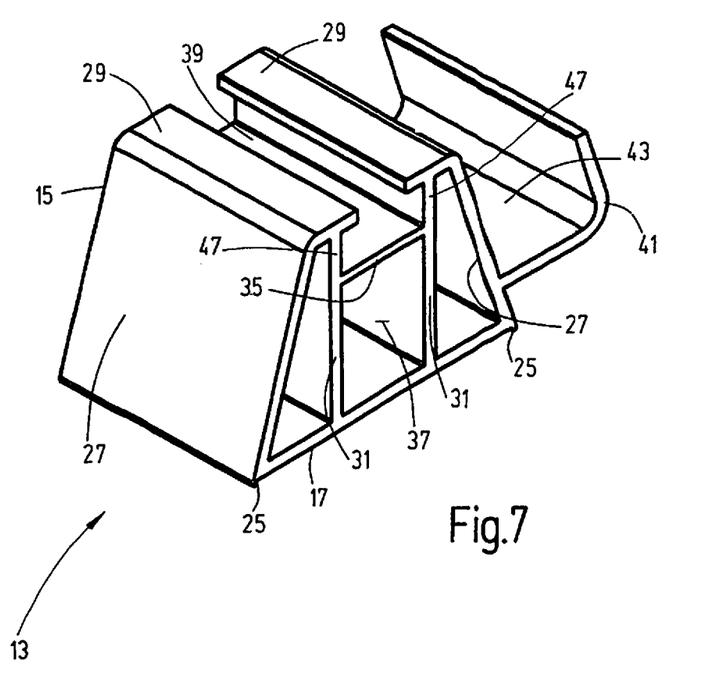
FIG. 7 is a perspective view of a modified exemplary embodiment of a support element according to the invention.
Figure 8:
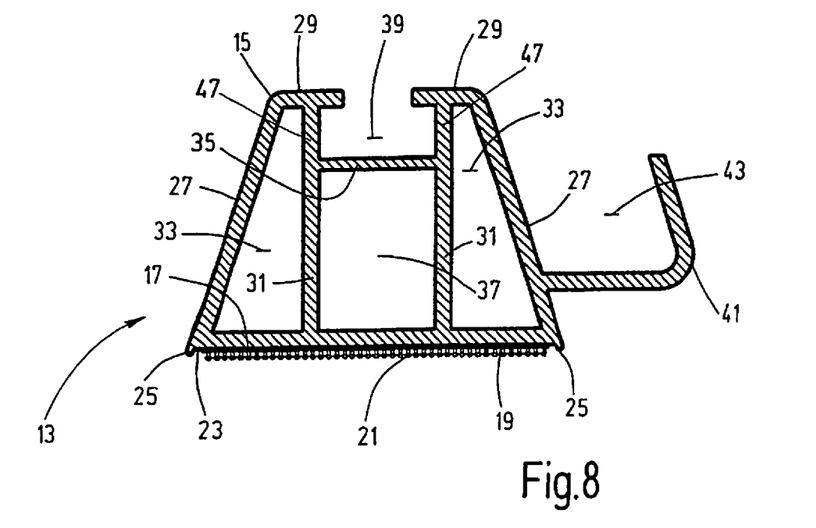
FIG. 8 is a side elevational view in section of the support element of FIG. 7.

FIGS. 7 and 8 show a modified exemplary embodiment of the hollow profile 15 which differs from the example from FIGS. 5 and 6 simply in that the inside walls 31 run at a distance to one another, parallel to one another, and perpendicular to the fastening surface 17, so that space 43 located underneath the intermediate wall 35 has a rectangular cross section.

FIGS. 9 and 10 show one modified exemplary embodiment of the hollow profile 15 from FIGS. 7 and 8 without the laterally attached rail, with one line 45 at a time being inserted into the receiving spaces 33 formed between the side wall 27 and inside wall 31. The hollow profile from FIGS. 9 and 10 and likewise the hollow profile 15 from FIGS. 7 and 8 also differ from the hollow profile 15 according to FIGS. 5 and 6 in that the space 39 open at the top has the cross-sectional shape of a rectangular dovetail guide with wall parts which run perpendicular to one another by the end sections of 47 of the inside walls 31, which sections run parallel to one another.

FIGS. 11 and 12 show one modified embodiment for the mounting rail 13 in the form of an elongated, relatively flat profile strip 16. In the same manner as the hollow profile 15, the profile strip is extruded from a corresponding plastic material in an extrusion process. The strip 16, like the hollow profile 15, on the underside has a flat fastening surface 17 for a touch-and-close fastener element 19. In the central region of the fastening surface 17, from its top 18 a clamping part 20 extends in the longitudinal direction of the strip 16, with the clamping part 20 having a cross-sectional shape in the form of a flat T with lateral clamping wings 22 which border a longitudinal slot 24 between themselves and the top 18 of the fastening surface 17. As FIG. 11 illustrates, a flexible solar panel 26 can be inserted into the respective longitudinal slot 24, with the wings 22 fastening the fastening edge 28 of the solar panel 26 by clamping; see FIG. 11. The solar panel 26 can be an arrangement of solar modules which is located on a backing film which consists of a preferably napped plastic sheet with a rectangular outline. In commercial solar panels of this type, the plastic film supporting the modules has dimensions of about 55×40 cm and consists of a weather-resistant plastic material, such as PMMA or PTFE, with the edge zones 28 which are free of modules being usable as holding regions for fastening of the panels 26.

Figure 13:
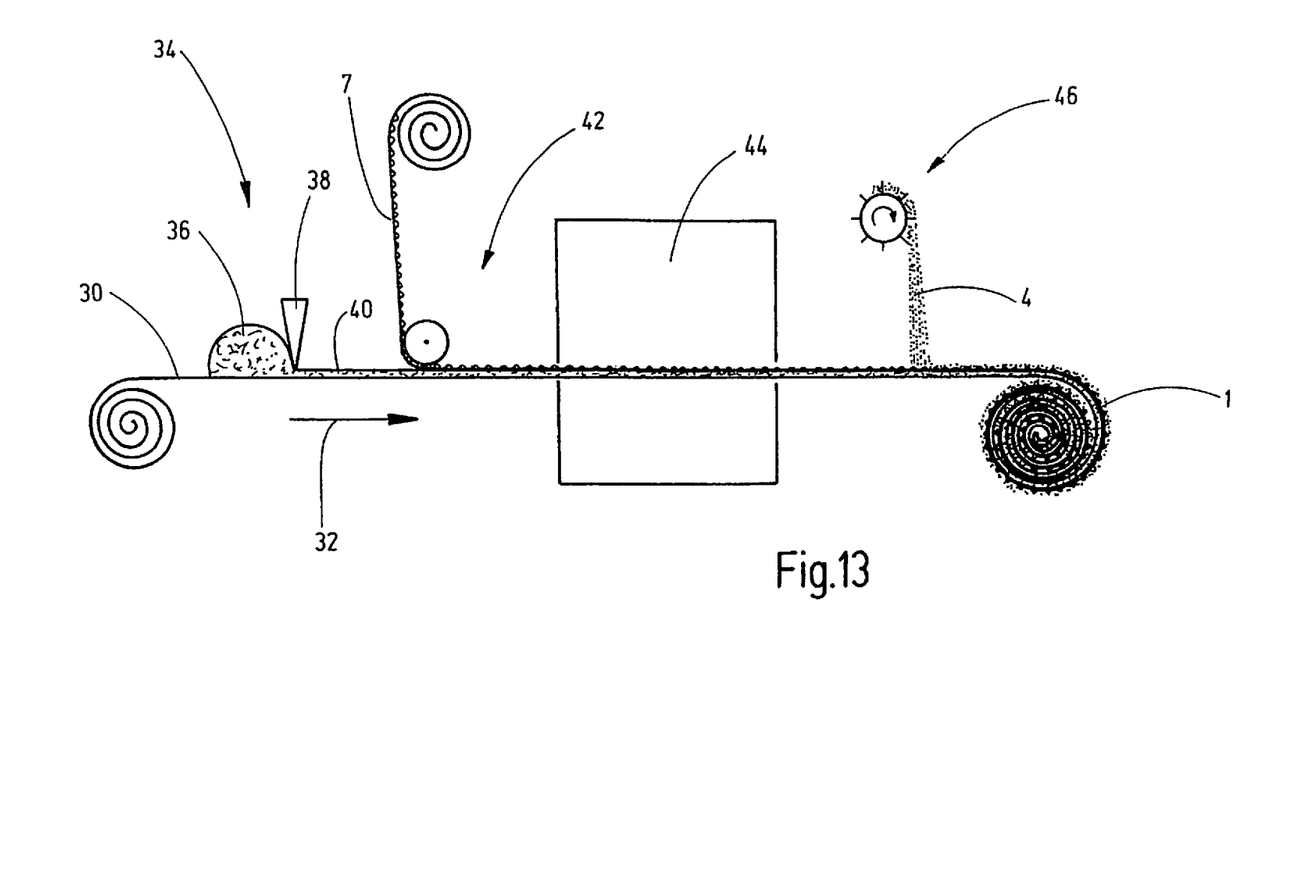
FIG. 13 is a highly schematically and simplified side elevational view of a device for producing a support surface for use in the fastening system according to an exemplary embodiment of the invention.

FIG. 13 shows highly simplified the production of a support surface 1 on a bitumen web 2 which is provided with the assigned touch-and-close fastener element 7 and with attached granulate 4. In the device, a backing web 30 of plastic material such as PTFE is moved in one transport direction marked with arrow 32 past an application station 34 on which a bitumen layer 40 is formed on the transport web 30 from a bitumen mass, a so-called "molasses" 36, by means of a doctor blade 38. The transport web with the formed bitumen layer 40 is moved past an attachment station 42 at which the pertinent touch-and-close fastener element 7 is attached on the top of the bitumen layer 40; as described above, this takes place by cementing it or laminating it on. Then the transport web 30 with the bitumen layer 40 and with the attached tape of the touch-and-close fastener element 7 runs through a drier 44 to a following sprinkling station 46 at which granulate for attachment is scattered in the surface regions which are free of the touch-and-close fastener element 7. The support surface 1 which has been produced in this way can at this point be wound up together with the backing web 30 and transported as a coil to the site of use (such as a construction site) where, after unwinding, the backing web 30 can be removed from the underside of the support surface 1 before its actual use.

One very great advantage of this invention is that in the indicated production method, the loop tape to be applied with its base fabric structure need not be immersed into the bitumen web, but is applied rather almost flush to the top of the bitumen web. If bitumen components penetrate into the base surface of the backing fabric of the loop tape, they allow a strong connection of the loop tape to the base backing material in the form of the bitumen layer without the interlocking capacity of the loop material being adversely affected. This also applies to the case in which the loop surface is replaced by an interlocking layer also in a mushroom form.

While various embodiments have been chosen to illustrate the invention, it will be understood by those skilled in the art that various changes and modifications can be made therein without departing from the scope of the invention as defined in the appended claims

What is claimed is:

1. A fastening system on building roof surfaces for photovoltaic systems, comprising:
    a backing web of a bituminous mass with a support surface;
    at least one first fastening component of at least one of loops or other interlocking elements of a touch-and-close fastener on said support surface;
    a structural element holder having at least one second fastening component of at least one of loops or other interlocking elements of a touch-and-close fastener matable with and on said first fastening component in a mounted state of said holder on said support surface, said structural element holder having a fastening surface on which said second fastening component is mounted, said fastening surface having first and second edges with first and second ribs, respectively, projecting from said fastening surface forming a guide for said second fastening component.

2. The fastening system according to claim 1 wherein said holder comprises a mounting rail having said second fastening component on a side thereof facing said support surface.

3. The fastening system according to claim 2 wherein said first fastening component is in a form of at least one tape extending on a surface of said support surface along said mounting rail.

4. The fastening system according to claim 2 wherein each said fastening component comprises a backing having a first side from which said one of loops or other interlocking elements thereof extend, said backings being bonded to said support surface and said mounting rail, respectively.

5. The fastening system according to claim 2 wherein said mounting rail is formed of acrylic-nitrile-styrene-acrylate.

6. The fastening system according to claim 5 wherein said mounting rail comprises a hollow profile with spaces receiving at least one of holding lines and other photovoltaic system components therein.

7. The fastening system according to claim 6 wherein said hollow profile comprises wall parts forming at least one of support and fastening regions for solar panels.

8. The fastening system according to claim 2 wherein said mounting rail comprises a profile strip having at least one longitudinal slot receiving a fastening edge of a solar panel.

9. The fastening system according to claim 2 wherein said mounting rail comprises a plastic extrusion.

10. The fastening system according to claim 9 wherein said mounting rail comprises a profile with a fastening surface, said second fastening element is attached by cementing to said mounting rail.

11. The fastening system according to claim 9 wherein said mounting rail comprises a hollow profile having at least one space receiving photovoltaic system components.

12. The fastening system according to claim 11 wherein said hollow profile comprises at least one closed receiving space.

13. The fastening system according to claim 11 wherein said hollow profile comprises at least one open receiving space forming a cable duct.

14. The fastening system according to claim 11 wherein said hollow profile comprises side walls extending from a lower flat fastening surface and converging upwardly, said side walls having upper ends adjoining profile webs forming an attachment region for a solar panel component.

15. The fastening system according to claim 11 wherein said hollow profile comprises closed receiving spaces therein with at least one of triangular or rectangular cross-sectional configurations.

16. The fastening system according to claim 1 wherein said holder comprises a strip having at least one longitudinal slot receiving therein a fastening edge of a solar panel.

17. The fastening system according to claim 1 wherein said backing web extends along a longitudinal axis of said backing web; and
said first fastening component has a longitudinal axis extending along said longitudinal axis of said backing web.

18. The fastening system according to claim 1 wherein said ribs project from said fastening surface at an angle and extend along a longitudinal direction of said structural element holder.

19. The fastening system according to claim 1 wherein said ribs and said fastening surface define a recess receiving said second fastening component, said ribs extending from said fastening surface by a distance less that a distance said second fastening component extends from said fastening surface.

* * * * *